United States Patent
Burguete Archel et al.

(10) Patent No.: US 10,637,346 B2
(45) Date of Patent: Apr. 28, 2020

(54) FILTERING METHOD FOR THE ALTERNATING CURRENT SIDE OF A POWER CONVERSION SYSTEM, AND POWER CONVERSION SYSTEM

(71) Applicant: INGETEAM POWER TECHNOLOGY, S.A., Zamudio, Bizkaia (ES)

(72) Inventors: Eduardo Burguete Archel, Sarriguren (ES); Mikel Zabaleta Maeztu, Sarriguren (ES); Igor Larrazabal Bengoetxea, Sarriguren (ES); Ignacio Zubimendi Azaceta, Sarriguren (ES); Danel Madariaga Zubimendi, Sarriguren (ES); Markel Zubiaga Lazkano, Sarriguren (ES)

(73) Assignee: INGETEAM POWER TECHNOLOGY, S.A., Zamudio, Bizkaia (ES)

( * ) Notice: Subject to any disclaimer, the term of this patent is extended or adjusted under 35 U.S.C. 154(b) by 0 days.

(21) Appl. No.: 16/094,768

(22) PCT Filed: Apr. 19, 2016

(86) PCT No.: PCT/ES2016/070278
§ 371 (c)(1),
(2) Date: Oct. 18, 2018

(87) PCT Pub. No.: WO2017/182680
PCT Pub. Date: Oct. 26, 2017

(65) Prior Publication Data
US 2019/0131865 A1 May 2, 2019

(51) Int. Cl.
*H02M 1/12* (2006.01)
*H02J 3/18* (2006.01)
*H02M 7/44* (2006.01)

(52) U.S. Cl.
CPC .............. *H02M 1/12* (2013.01); *H02J 3/1821* (2013.01); *H02M 7/44* (2013.01); *Y02E 40/30* (2013.01)

(58) Field of Classification Search
CPC ............ H02M 5/40; H02M 5/42; H02M 5/44; H02M 5/443; H02M 5/45; H02M 5/4505;
(Continued)

(56) References Cited

U.S. PATENT DOCUMENTS

2009/0273185 A1* 11/2009 Ruiz Flores ............ H02P 9/007
290/44
2012/0155125 A1* 6/2012 Zhang ..................... H02M 1/44
363/34
(Continued)

FOREIGN PATENT DOCUMENTS

WO       2015092553 A2     6/2015

OTHER PUBLICATIONS

Mikel Zabaleta et al. "LCL Grid Filter Design of a Multi-Megawatt Medium-Voltage Converter for Offshore Wind Turbine using SHEPWM Modulation" IEEE Trans. Ind. Electron., Mar. 2016, 8 pages, vol. 31, No. 3.
(Continued)

*Primary Examiner* — Bryan R Perez
(74) *Attorney, Agent, or Firm* — Sughrue Mion, PLLC

(57) ABSTRACT

A filtering method for the alternating current side of a power conversion system by a filter circuit, and system that includes the filter circuit. Said filter circuit includes a filter capacitor circuit and a damping circuit connected to the filter capacitor circuit. Upon determining that the power conversion system operates under steady state conditions, the damping circuit of the filter circuit is caused to present a first impedance value for the current that flows through said damping circuit, and upon determining that the power conversion system is operating under transient state conditions, said damping circuit is caused to present a second impedance value for said current.

18 Claims, 5 Drawing Sheets

(58) Field of Classification Search
CPC ...... H02M 5/451; H02M 5/452; H02M 5/458; H02M 5/4585; H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 2007/4803; H02M 2007/4822; H02M 1/12; Y02E 40/30; H02J 3/1821
See application file for complete search history.

(56) References Cited

U.S. PATENT DOCUMENTS

| | | |
|---|---|---|
| 2013/0039105 A1 | 2/2013 | Rozman et al. |
| 2016/0013715 A1* | 1/2016 | Patel .................... H02M 1/126 363/44 |

OTHER PUBLICATIONS

A. Reznik et al., "LCL Filter Design and Performance Analysis for Grid Interconnected Systems", IEEE Transactions on Industry Applications, Mar./Apr. 2014, 7 pages, vol. 50, No. 2.
International Search Report of PCT/ES2016/070278 dated Jan. 25, 2017.

* cited by examiner

FILTERING METHOD FOR THE ALTERNATING CURRENT SIDE OF A POWER CONVERSION SYSTEM, AND POWER CONVERSION SYSTEM

TECHNICAL FIELD

The present invention is related to filtering methods for the alternating current side of a power conversion system, and to power conversion systems with which the power delivered at the alternating current side is filtered.

BACKGROUND

With the increase of unitary power of power generation units, it is becoming more and more common to use power conversion topologies based on multilevel power converters due to the increase of the unitary power of wind turbines. Together with the development of technology, grid codes have become more demanding, and requirements and recommended practices have been established regarding the power quality delivered to the grid.

It is known that power converters, included in power conversion systems used for transforming energy generated from a variable source for connection to the grid, produce output currents and voltages that include harmonic components at the switching frequency (SWF) of the power converters and multiples of those harmonic components. With the objective of limiting those harmonic components below certain maximum values, the installation of filters at the alternating current side such as LC or LCL filters at the output of the power converters 103' is commonly known in power conversion systems 100', as shown in FIG. 1 for example, and several solutions have been analyzed related to the design of said type of filters. Some solutions include using an output reactor for the output of each power converter, an RC branch, and a second reactor connected to the grid.

A commonly used design criteria, as disclosed for example in "*LCL filter design and performance analysis for Grid Interconnected Systems (IEEE Transactions on Industry Applications VOL 50, No. 2, March/April* 2014*, pages* 1125/1232)", is to select a filter at the alternating current side of the converter comprising a configuration or topology with a resonant frequency (fres) is far enough from both the switching frequency (fsw) of the power converter and the fundamental frequency of the grid (fg), according to the following equation:

$$10 f_g < f_{res} < 0.5 f_{sw}$$

Also, a damping resistive element is usually included for attenuating the resonance of the filter.

However, in some applications it is difficult to meet that commonly used design criteria, for example when designing filters for medium-voltage converters for high power applications, because in said applications the switching frequency of the power converter is limited to about 1 kHz due to the junction temperature constraint of the semiconductors of the power converter. Thus, the frequency band between the fundamental frequency of the grid and the switching frequency of the power converter is limited to a little more than one decade, and accordingly, it is a challenge to design the LCL filter design to meet grid requirements for grid connected applications.

Traditional designs are focused on the optimization of the filter parameters and different damping circuits at resonance frequencies, through the selection of a determined impedance value that ensures fulfillment of the grid code power quality requirements. However, these designs might not be optimum from the point of view of efficiency, since depending on the damping impedance required, the power losses at fundamental frequency increase.

In order to avoid the use of inefficient damping circuits, some prior solutions propose damping the harmonics through modulation techniques, as disclosed in "*LCL Grid Filter Design of a Multi-Megawatt Medium-Voltage Converter for Offshore Wind Turbine using SHEPWM Modulation* (*IEEE Trans. Ind. Electron., vol.* 31*, no.* 3*, pp.* 1993-2001*, March* 2016)". However, although these technics are adequate for steady state conditions, they have limitations during transients since the control is not able to damp the resonances fast enough.

In the patent document US20130039105A1 a controllable filter topology at the alternating current side of a power converter is proposed. The filter includes a plurality of capacitors and a single damping resistive element, a rectifier connected between the capacitors and the single damping resistor, and a switching element for disconnecting the damping resistor during start-up of the power conversion system, said damping resistor being connected once the system is under steady state conditions (under normal operation). With said controllable filter topology and the control method proposed in said patent document, the power factor of the conversion system during the start-up is modified, at the same time that the filter maintains its filtering ability during steady state conditions (or normal operation). However, this solution is not focused and does not provide a solution for the problems that could arise when the system has to cope with grid transients (transient state), such as fault ride through or overvoltage events, for example. During a transient state, the non-dampened resonance frequency of the filter is excited, the control band width does not allow controlling the transient, and the reactive current injection time requirements cannot be fulfilled. This could imply the loss of the control of the currents until the transitory response is mitigated due to the parasitic impedances of the system.

SUMMARY

Certain non-limiting exemplary embodiments can provide a filtering method for the alternating current side of a power conversion system with a filter circuit arranged at said alternating current side, and a power conversion system including the filter circuit.

A first aspect of certain non-limiting exemplary embodiments refers to a filtering method for the alternating current side of a power conversion system by a filter circuit arranged at said alternating current side, the filter circuit including a filter capacitor circuit and a damping circuit connected to the filter capacitor circuit. In the method it is determined if the power conversion system is operating under steady state conditions or under transient state conditions. Upon determining that the power conversion system operates under steady state conditions, the damping circuit of the filter circuit is caused to present a first impedance value for the current that flows through said damping circuit. Upon determining that the power conversion system is operating under transient state conditions, said damping circuit is caused to present a second impedance value for said current, said second impedance value being different from the first impedance value, preferably greater.

Therefore, when the power conversion system operates under steady state conditions the losses in the filter circuit are decreased compared with the prior solutions, and, at the same time, when the power conversion system does not operate under steady state conditions (when it operates under transient state conditions), the safety conditions are ensured as the impedance value is modified for those conditions, with the objective of complying with the demanding reactive current injection times required by grid codes.

By modifying the impedance value for transient state conditions (not steady state conditions) it is possible to reduce the duration of this transitory response, and this allows the power conversion system to recover control of the currents at the alternating current side with a lower time lapse. Additionally, the modification of the impedance value reduces the module of said currents, thus reducing the electromechanical stress of the components of the filter circuit and of the power conversion system, the lifetime of said components being increased.

Another effect of presenting the second impedance value different from the first impedance value is that the resonance frequency can be moved during the transient state conditions. Thus, besides limiting the resonance peak, said peak could be moved to another frequency in which said peak is not excited by the control or could be more easily dampened during transient state conditions.

A second aspect of certain non-limiting exemplary embodiments refers to a power conversion system for converting energy from an alternating current or direct current power source. The power conversion system includes a power converter which is connected to an electrical grid, and a filter circuit arranged at the alternating current side of the power conversion system.

The filter circuit includes a filter capacitor circuit and a damping circuit connected to the filter capacitor circuit. The damping circuit is connected in series or in parallel to the filter capacitor circuit and is configured to present a first impedance value for a current that flows through the damping circuit when the power conversion system is operating under steady state conditions, and to present a second impedance value for said current when the power conversion system is not operating under steady state conditions, the second impedance value being different from the first impedance value, preferably greater. The power conversion system further includes a selecting device configured to cause the damping circuit to present the first impedance value or the second impedance value, according to the conditions under which the power conversion system is operating.

Thus, when the power conversion system is operating under steady state conditions the losses through the filter circuit can be decreased compared with the prior solutions, and at least the same advantages already mentioned for the first aspect are obtained in the power conversion system of the second aspect.

These and other advantages and features of the invention will become evident in view of the drawings and detailed description of certain embodiments of the invention.

DETAILED DESCRIPTION

The following detailed description is provided to assist the reader in gaining an understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof.

Figure 1:
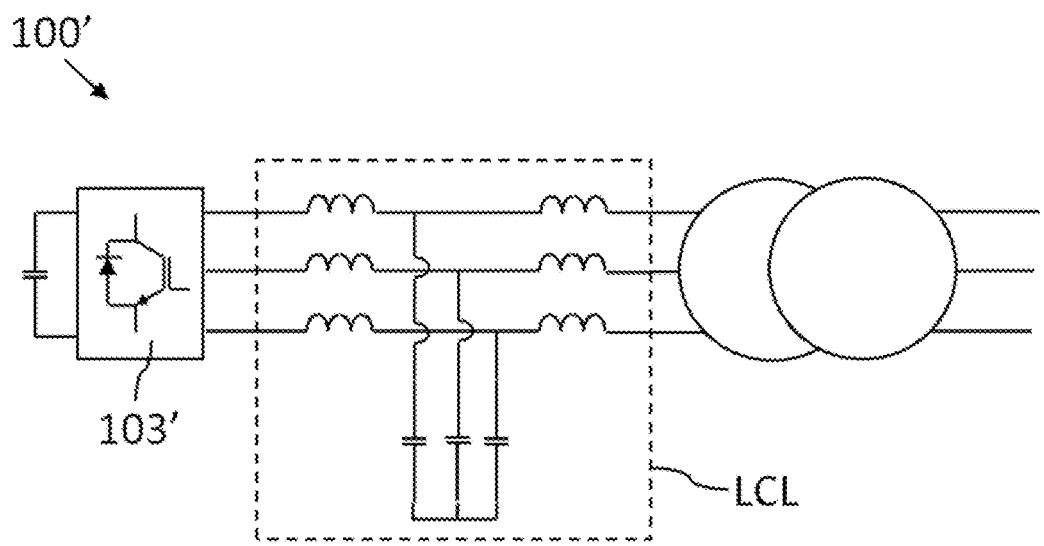
FIG. 1 shows, schematically, a conventional power conversion system.
Figure 2:
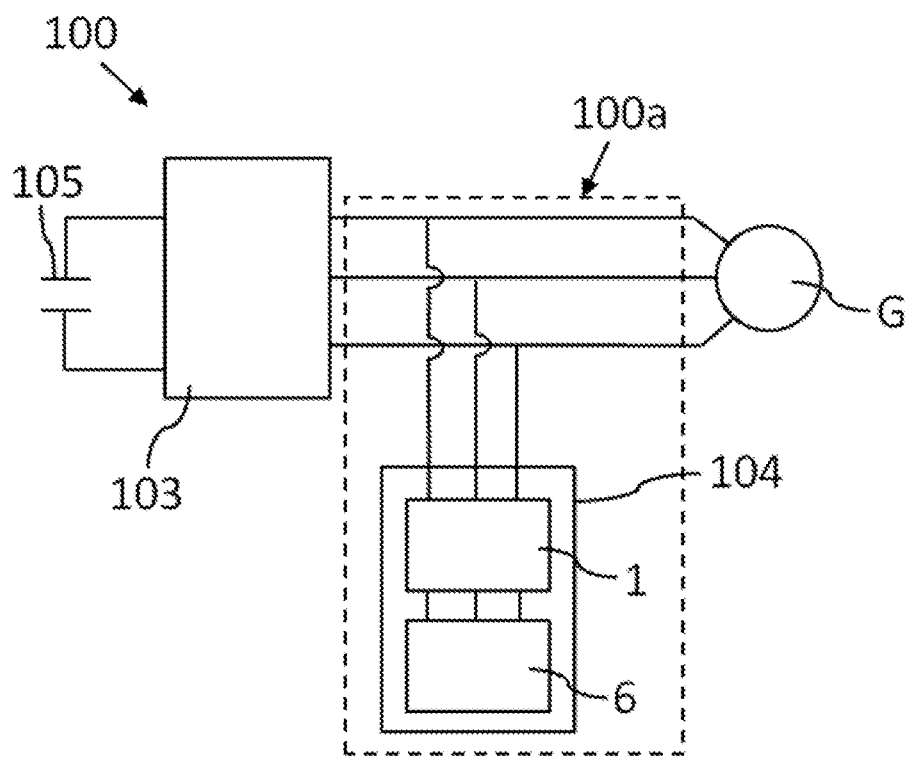
FIG. 2 shows, schematically, an embodiment of the power conversion system.
Figure 3:
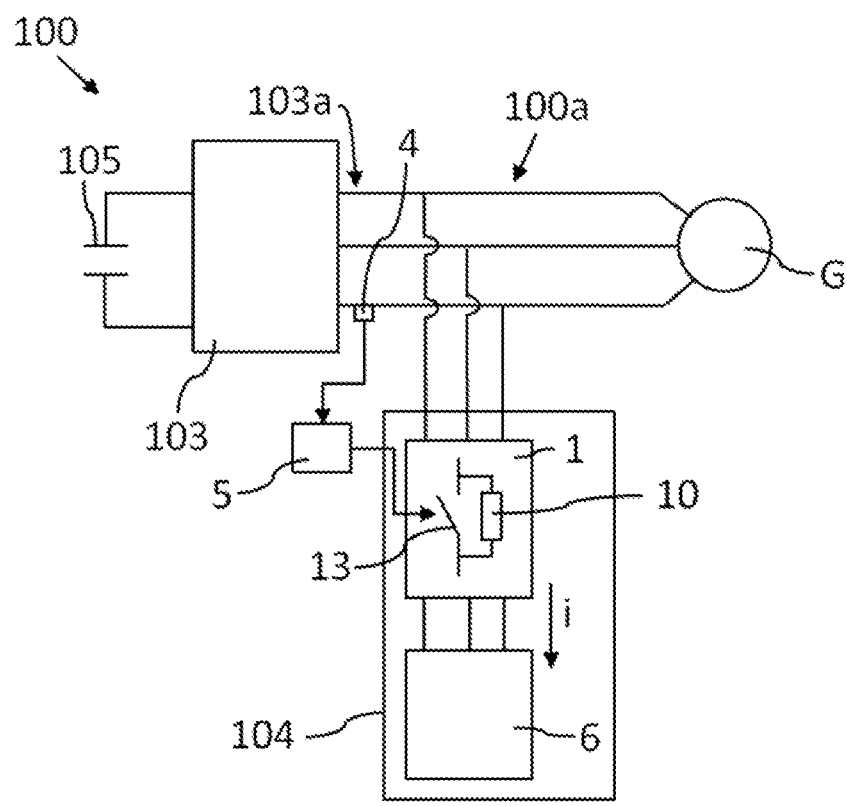
FIG. 3 shows, schematically, an embodiment of the power conversion system, where a switching actuator and a component associated to said switching actuator of the damping circuit are shown.

A first aspect of an exemplary embodiment refers to a filtering method for the alternating current side 100a of a power conversion system 100, carried out by a filter circuit 104 arranged at the alternating current side 100a of the power conversion system 100. Preferably the alternating current side 100a is three-phase. The power conversion system 100 includes a power converter 103 with an alternating current side 103a forming part of the alternating current side 100a of the power conversion system 100 and which is connected to an electrical grid G, directly or through at least one component such as a transformer. As shown in the examples of FIGS. 2 and 3, both the power converter 103 and the filter circuit 104 form part of the power conversion system 100 itself. As shown by way of example in said FIGS. 2 and 3, the filter circuit 104 includes, at least, a filter capacitor circuit 6 that includes at least one filter capacitor per each phase of the alternating current side 100a, and a damping circuit 1 connected to the filter capacitor circuit 6, the filter circuit 104 being connected to the alternating current side 103a of the power converter 103.

When the power conversion system 100 connected to a grid G for delivering power to said grid G operates normally, the power conversion system 100 is said to be operating under steady state conditions. When the power conversion system 100 is not operating under steady state conditions, said power conversion system 100 is said to be operating under transient state conditions. Said transient state conditions can be given during voltage-dips or over-voltages at the alternating current side 100a of the power conversion system 100 for example, or during other failure conditions at said alternating current side 100a.

In the method, it is determined if the power conversion system 100 is operating under steady state conditions or under transient state conditions, and, upon determining that the power conversion system 100 is operating under steady state conditions the damping circuit 1 of the filter circuit 104 is caused to present a first impedance value for a current i that flows through the damping circuit 1, and upon determining that the power conversion system 100 is operating under transient state conditions the damping circuit 1 of the filter circuit 104 is caused to present a second impedance value for said current i. The second impedance value is different from the first impedance value, preferably greater.

If the damping circuit 1 has a single branch, the current i that flows through it has a single component. However, if the damping circuit 1 has more branches (for example 2 or 3 parallel branches), the current i that flows through it is divided into different components. Throughout the description a current i refers to the current that flows through the damping circuit, and as such, current i must be interpreted as the only component (in the case of a single branch in the damping circuit 1) or the sum of all components (in the case of a plurality of branches in the damping circuit 1) of the current flowing through the damping circuit.

Therefore, the impedance value of the filter circuit 104 can be varied in a very simple manner upon detecting that the operating conditions of the power conversion system 100 vary (from the transient state conditions to the steady state conditions or vice versa), and the filter circuit 104 can be optimized for the determined operating conditions with minimum loses at steady state conditions, and for ensuring stability and controllability of said power conversion system 100 during transient state conditions. As the second impedance value is different from the first impedance value, during transient state conditions the filter circuit 104 filters at the currents at the alternating current side 100a of the power conversion system 100 avoiding the control-loss over said currents, and when the power conversion system 100 is operating under steady state conditions the filter circuit 104 does not cause great losses and the efficiency of the power conversion system 100 is not reduced in a great extent at steady state conditions.

In order to determine if the power conversion system 100 is operating under steady state conditions or under transient state conditions, at least one electrical property of at least one electrical signal associated to the alternating current side 100a of the power conversion system 100 is measured or detected, and the conditions under which the power conversion system 100 is operating are determined according to said measure. The measure of an electrical property at the alternating current side 100a of the power conversion system 100 can be done in a known manner, by way of known sensors, and, therefore, the method can be implemented in a very easy way in power conversion systems and without the need of adding additional complex components. Additionally, such type of power conversion systems 100 generally includes a device for measuring or detecting an electrical property at the alternating current side 100a, and consequently, in such power conversion system 100 no additional components are needed, or additional measurements could be taken as for example the voltage or current through the filter circuit 6 in the case of adding additional sensors. The electrical property can be measured or detected at the alternating current side 103a of the power converter 103, at the filter circuit 104, or at any other point of the alternating current side 100a of the power conversion system 100.

Therefore the measured electrical property can be selected, for example, from the module of a voltage signal at the alternating current side 100a of the power conversion system 100 (at any phase), the module of a current signal at said alternating current side 100a (at any phase), the frequency of a voltage signal at the alternating current side 100a (at any phase), and the frequency of a current signal at the alternating current side 100a (at any phase):

if the selected electrical property is the module of a voltage signal at the alternating current side 100a of the power conversion system 100, the power conversion system 100 is determined to be operating under steady state conditions if the value of said electrical property is greater than a minimum predetermined value of the corresponding module and less than a maximum predetermined value of said module, and the power conversion system 100 is determined to be operating under transient state conditions if the value of said electrical property is less than or equal to said minimum predetermined value of the corresponding module or greater than or equal to said maximum predetermined value of said module;

if the selected electrical property is the module of a current signal at the alternating current side 100a of the power conversion system 100, the power conversion system 100 is determined to be operating under steady state conditions if the value of said electrical property is greater than a minimum predetermined value of the corresponding module and less than a maximum predetermined value of said module, and the power conversion system 100 is determined to be operating under transient state conditions if the value of said electrical property is less than or equal to said minimum predetermined value of the corresponding module or greater than or equal to said maximum predetermined value of said module;

if the selected electrical property is the frequency of a voltage signal at the alternating current side 100a of the power conversion system 100, the power conversion system 100 is determined to be operating under steady state conditions if the value of said electrical property is greater than a minimum predetermined value of the corresponding frequency and less than a maximum predetermined value of said frequency, and the power conversion system 100 is determined to be operating under transient state conditions if the value of said electrical property is less than or equal to said minimum predetermined value of the corresponding frequency or greater than or equal to said maximum predetermined value of said frequency; and if the selected electrical property is the frequency of a current signal at the alternating current side 100a of the power conversion system 100, the power conversion system 100 is determined to be operating under steady state conditions if the value of said electrical property is greater than a minimum predetermined value of the corresponding frequency and less than a maximum predetermined value of said frequency, and the power conversion system 100 is determined to be operating under transient state conditions if the value of said electrical property is less than or equal to said minimum predetermined value of the corresponding frequency or greater than or equal to said maximum predetermined value of said frequency.

The damping circuit 1 is configured to offer two alternative paths with different impedance values to the current i flowing through it, the damping circuit 1 including a switching actuator 13 which is controlled to select the path to be followed by the current i when flows through the damping circuit 1. The switching actuator 13 is configured to adopt two different states, each one of said states being associated with a path to be followed by the current i when the current flows through the damping circuit 1: when the switching actuator 13 is in a first state the current i is caused to flow through the first path in the damping circuit 1, and when the switching actuator 13 is in a second state the current i is caused to flow through the second path in the damping circuit 1. Controlling the switching actuator 13 it is possible to maintain or to modify its state.

The first path for the current i in the damping circuit offers the first impedance value for said current i, while a second path for said current i offers the second impedance value for said current i. Said effect is explained with the example shown in FIG. 3 for example. The second path includes the switching actuator 13, and at least one resistive and/or inductive component 10 associated to said switching actuator 13. Depending on the state of said switching actuator 13, the current i flows through the resistive and/or inductive component 10 or not. If the second impedance value is intended for the damping circuit 1, then the switching actuator 13 is caused to allow the current i to flow through the resistive and/or inductive component 10. In said situation, the current i flowing through the filter capacitor 6 flows through the second path of the damping circuit 1. If the first impedance value is intended for the damping circuit 1, then the switching actuator 13 is caused to not allow the current i to pass through the resistive and/or inductive component 10. In said situation, the current i flowing through the filter capacitor 6 flows through the first path of the damping circuit 1 instead of the second path.

In summary, the method can be implemented in power conversion systems 100 having damping circuits 1 of different configurations, provided that said damping circuits 1 have at least two alternative paths for the current I flowing said damping circuit 1: a first path for when the power conversion system 100 is operating under steady state conditions, and a second path for when said power conversion system 100 is operating under transient state conditions. The damping circuit 1 thus has at least one switching actuator 13 and at least one resistive and/or inductive component 10 associated to the switching actuator 13 by which the path for said current i is selected in a controlled manner.

Figure 4:
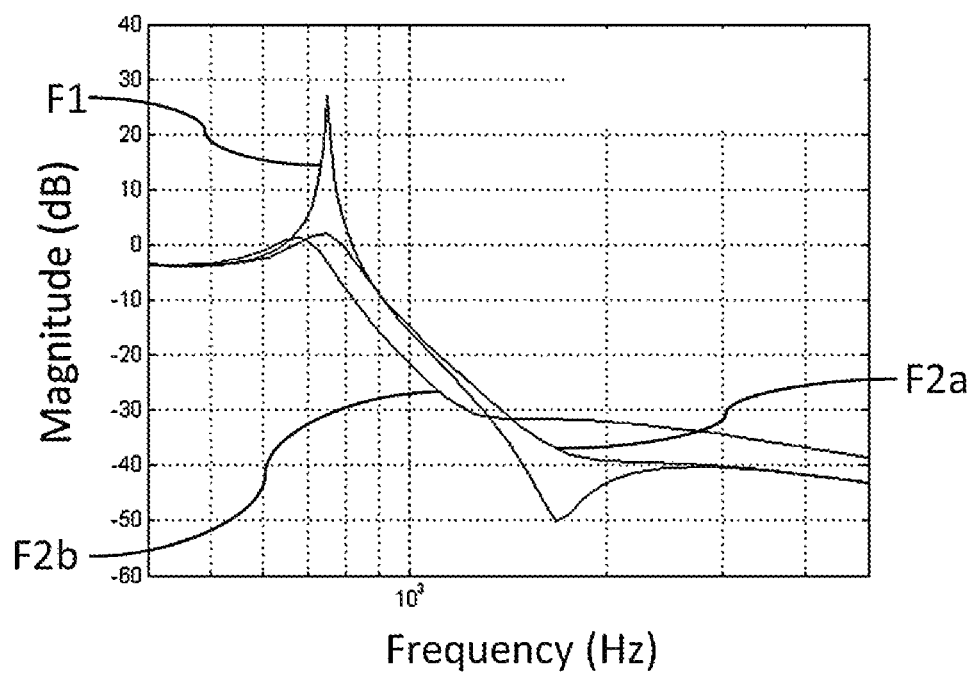
FIG. 4 shows the resonance in steady state conditions, and also the resonances in transient state conditions for two different examples of impedance values for the current passing through the damping circuit of an embodiment of the power conversion system.

As described before, another effect of the first aspect of certain exemplary embodiments is that the resonance frequency at the alternating current side 100a of the power conversion system 100 can be varied during transient state conditions, said resonance frequency depending on the configuration of the second path as is shown by way of example in FIG. 4. For said example it has been considered that the current flows through the resistive and/or inductive component 10 when flowing through the damping circuit 1. FIG. 4 shows the resonance F1 in steady state conditions, and also two different resonances F2a and F2b in transient state conditions for two different configurations of the second path. In the first example, the resonance F2a, the resistive and/or inductive component 10 is formed by a resistive element that dampens the resonance peak, but the resonance frequency is the same as during steady state conditions. In the example associated to the resonance F2b, the resistive and/or inductive component 10 is formed by a resistive element and an inductive element connected in series. The resistive element causes the peak to be dampened, and the incorporation of the inductive element causes a variation in the resonance frequency (from 750 Hz to 650 Hz approximately).

Thus, besides limiting the resonance peak, the resonance frequency can be varied during transient state conditions if desired. Therefore, another frequency can be selected such that the resonance is not excited or is dampened by the control of the power converter 103 more easily.

Figure 5:
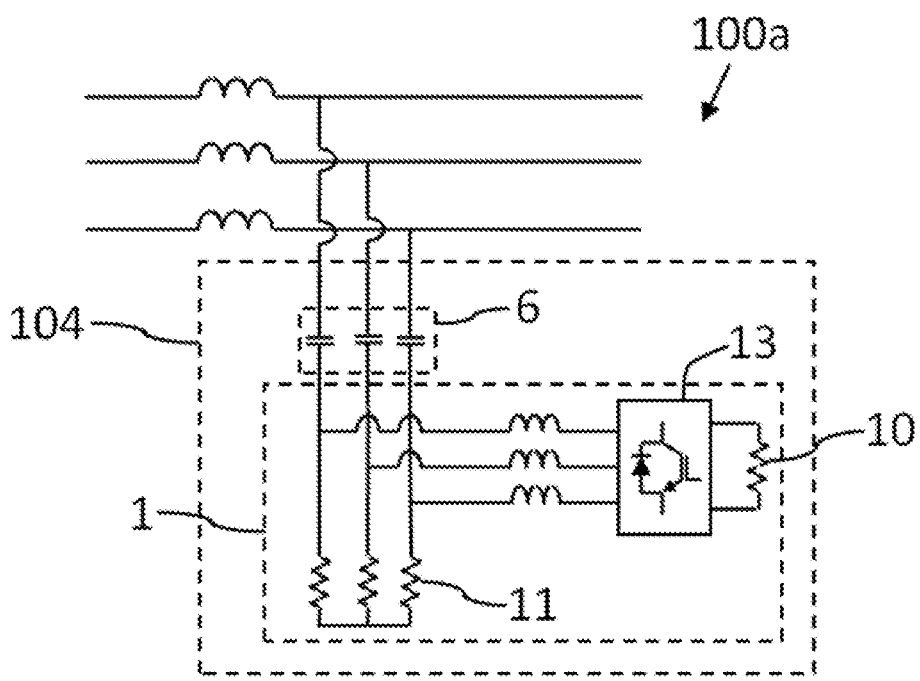
FIG. 5 shows a configuration of the damping circuit of an embodiment of the power conversion system.
Figure 6:
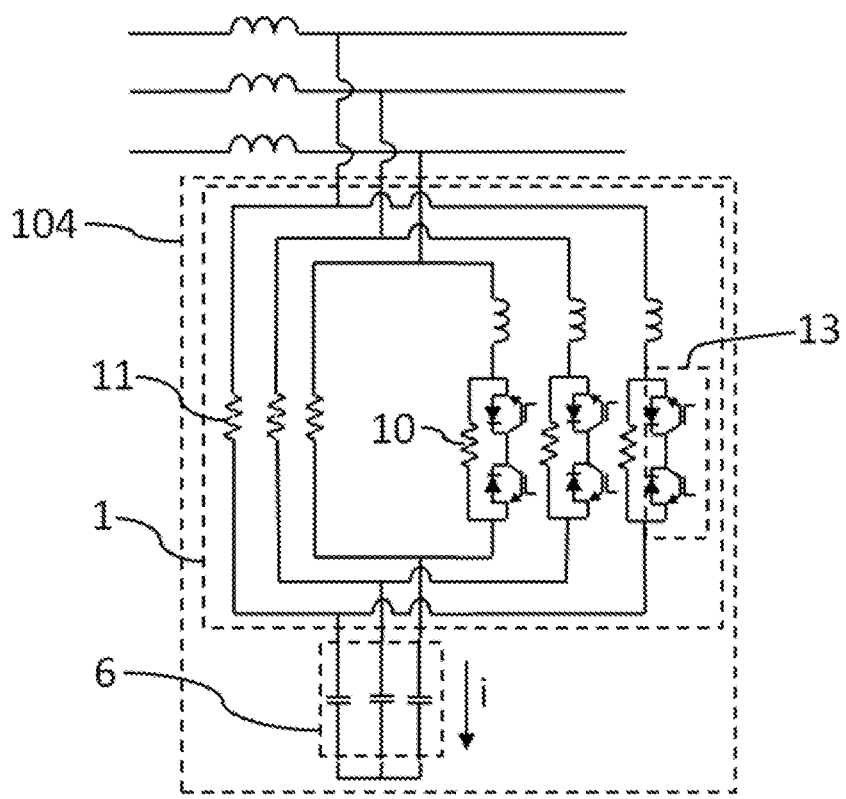
FIG. 6 shows a configuration of the damping circuit of an embodiment of the power conversion system.
Figure 7:
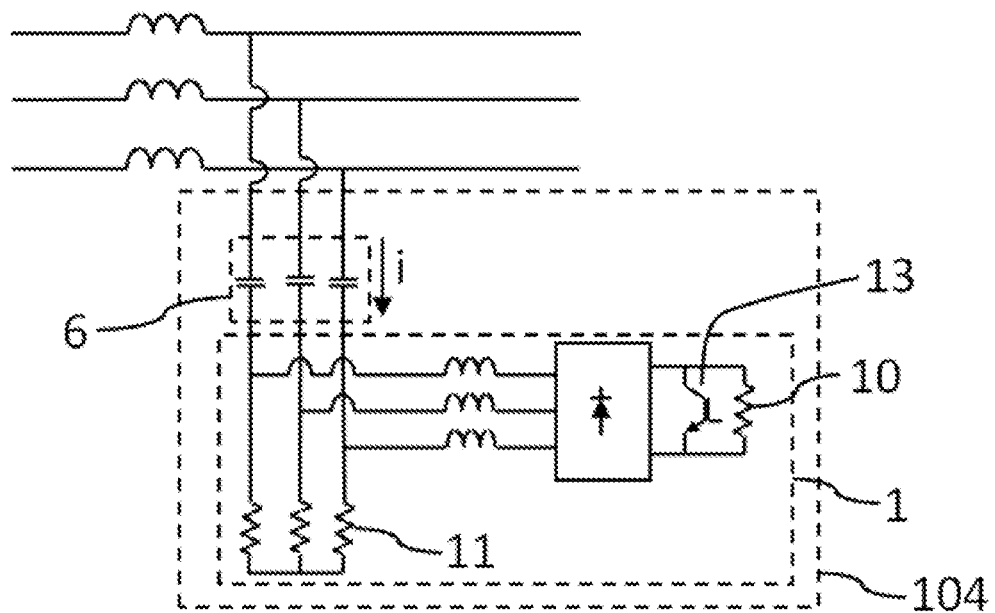
FIG. 7 shows a configuration of the damping circuit of an embodiment of the power conversion system.
Figure 8:
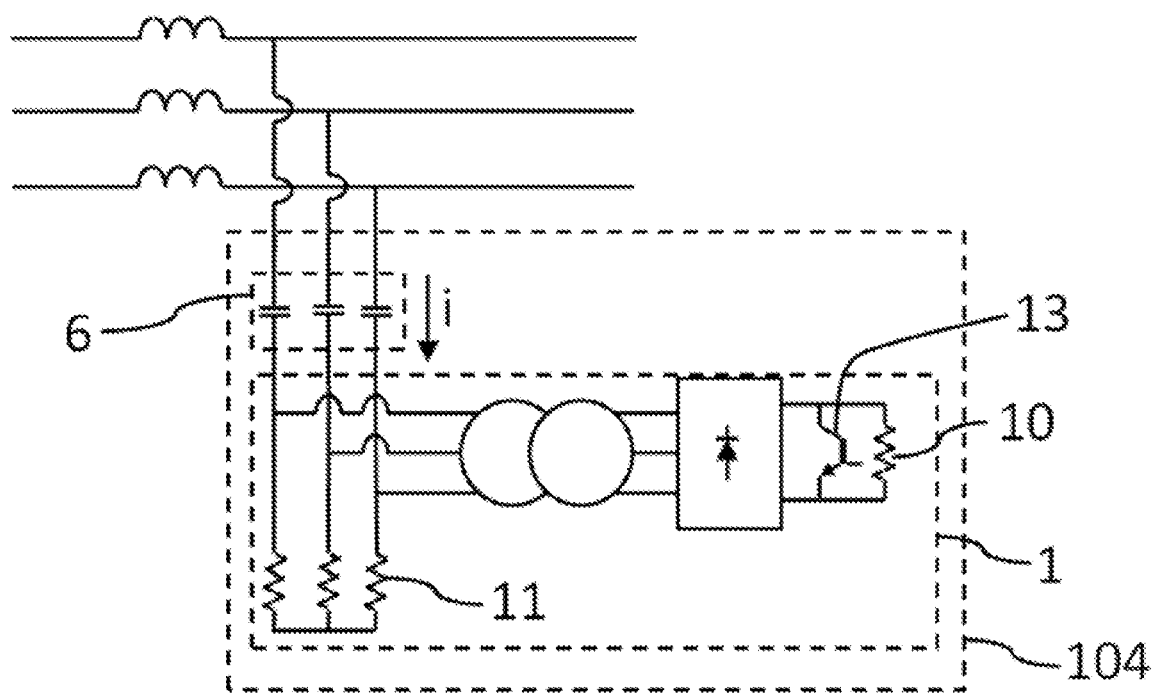
FIG. 8 shows a configuration of the damping circuit of an embodiment of the power conversion system.
Figure 9:
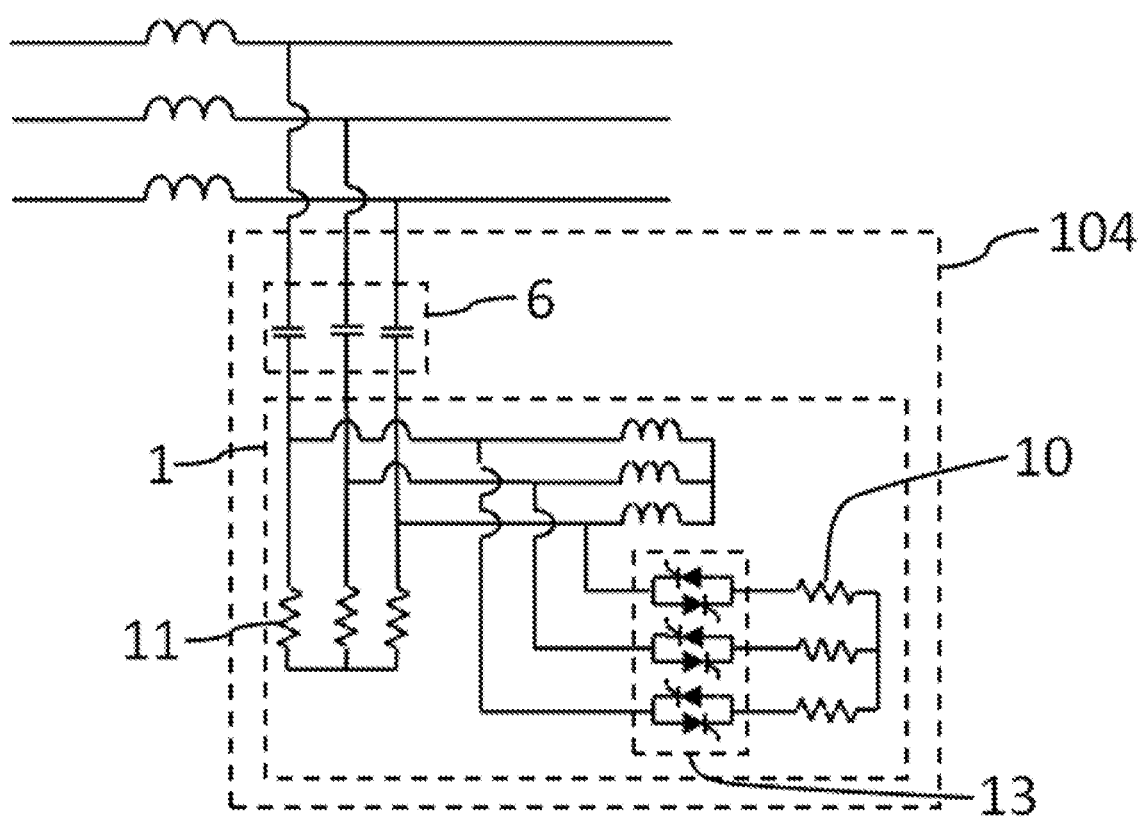
FIG. 9 shows a configuration of the damping circuit of an embodiment of the power conversion system.

In some embodiments, the switching actuator 13 has a plurality of switching elements, as shown in FIG. 5. Each one of the switching elements can be opened or closed, and said switching elements are controlled (their opening and closing) according to the measured electrical property at the alternating current side 100a of the power conversion system 100, to control the state of the switching actuator 13. Hence, by said control the path to be followed by the current i when it flows through the damping circuit 1 is selected between the two alternative paths.

In other embodiments, the switching actuator 13 has a switching element with two states, each one of said states being associated with a path to be followed by the current i when it flows through the damping circuit 1 and the state of the switching element being controlled (and that of the switching actuator 13) according to the measured electrical property at the alternating current side 100a of the power conversion system 100. Hence, by said control the path to be followed by the current i when it flows through the damping circuit 1 is selected between the two alternative paths. The switching actuator 13 can be, for example, a controlled switching element as shown in FIGS. 6 to 9, the first state being an open position of said switching element and the second state being a closed position of said switching element (or vice versa).

A second aspect of certain exemplary embodiments refers to a power conversion system 100 for converting the energy from an alternating current or from a direct current power source 105, as shown by way of example in FIGS. 2 and 3. The power conversion system 100 is adapted in such a way that the method according to certain embodiments can be implemented therein.

The power conversion system 100 includes a power converter 103 having an alternating current side 103a which is connected to a grid G, directly or through at least one component such as a transformer, and a filter circuit 104 arranged at the alternating current side 100a of the power conversion system 100. The filter circuit 104 includes a filter capacitor circuit 6 that includes at least one filter capacitor per each phase of the alternating current side 103a of the power converter 103 (or of the alternating current side 100a of the power conversion system 100), and a damping circuit 1 connected to the filter capacitor circuit 6. Preferably, the alternating current side 100a is three-phase.

The damping circuit 1 is connected in series or in parallel to the filter capacitor circuit 6, and it is configured to present a first impedance value for a current i that passes through the damping circuit 1 when the power conversion system 100 is operating under steady state conditions, and to present a second impedance value for said current i when the power conversion system 100 is operating under transient state conditions. The second impedance value is different from the first impedance value, preferably greater. The damping circuit 1 is configured to present the first impedance value or the second impedance value as required. Therefore, as explained when referring to the first aspect, the power conversion system 100 includes a filtering circuit 104 with which at least the already described advantages and effects both, when the power conversion system 100 is operating under steady state conditions or under transient state conditions, are obtained.

The power conversion system 100 further includes a selecting device, or selector, to cause the damping circuit 1 to present the first or second impedance value for the current i that flows through it in a controlled manner. The selecting device includes a measuring device 4 for measuring or detecting at least one electrical property of at least one electrical signal associated with the alternating current side 100a of the power conversion system 100, a switching actuator 13 arranged in the damping circuit 1, and a controller 5 in communication with said measuring device 4 and with the switching actuator 13. The controller 5 is configured to determine, according to said measured electrical property, the conditions under which the power conversion system 100 is operating (steady state or transient state), and to control the switching actuator 13 in order to cause the damping circuit 1 to present the first impedance value or second impedance value for the current i that flows through said damping circuit 1 according to said determination. The controller 5 can be a microprocessor unit, a microcontroller unit, a FPGA ("Field Programmable Gate Array") or other device with computing abilities, and can be the same controller in charge of controlling the power converter 103 (as represented in FIG. 3) or a different controller.

The explanation given when referring to the first aspect \ for the measured electrical property is also valid for the second aspect, and it is not thus replicated again. The measuring device 4 is configured, in each case, for measuring a current or a voltage, and to calculate their modules, or for measuring the frequencies of at least one current signal or a voltage signal, and the controller 5 is configured to calculate the module of the current or voltage if it is the case, and to determine according to said module or to the frequency the conditions under which the power conversion system 100 is operating.

The damping circuit 1 is configured for offering two alternative paths with different impedance values for the current i flowing through said damping circuit 1, the current i being able to follow a first path with a first impedance value r a second path with a second impedance value when flowing through said damping circuit 1. The path to be followed by the current i is selected by the selecting device at each moment depending on the determined operating conditions: if it is determined that the power conversion system is operating under steady state conditions, the first path is selected, and if it is determined that the power conversion system is operating under transient state conditions, the second path is selected. The first path presents a first impedance value for the current i, and the second path presents a second impedance value for said current i, different from the first impedance value, as commented before.

The switching actuator 13 is configured to adopt two different states, each one of said states being associated with a path to be followed by the current i when it flows through the damping circuit 1. The controller 5 is configured to control the state of said switching actuator 13, according to the determination of said controller 5 about the conditions under which the power conversion system 100 is operating.

The damping circuit 1 further includes at least one resistive and/or inductive component 10 associated to the switching actuator 13. When the first path is selected for the current i, the switching actuator 13 causes the current i to avoid flowing through the resistive and/or inductive component 10, and when the second path is selected for said current i, the switching actuator 13 causes the current i to flow through the resistive and/or inductive component 10. Therefore, when selecting the first or the second path, the impedance value of the path through which the current i flows is different. As described before, the controller 5 is in charge of causing the variation of the state of the switching actuator 13 to select one or the other path.

The damping circuit 1 can be configured in different ways, provided that said damping circuits 1 offers at least two alternative paths for the current i: a first path for when the power conversion system 100 is operating under steady state conditions, and a second path for when the power conversion system 100 is operating under transient state conditions. As schematically shown in FIG. 3, the damper circuit 1 includes at least one switching actuator 13 and at least one resistive and/or inductive component 10 associated with the switching actuator 13, said switching actuator 13 being configured and adapted for allowing or not, in a controlled manner (by the controller 5), a current to flow through said resistive and/or inductive component 10. When the current i that flows through said damping circuit 1 follows the second path, said current i flows through the resistive and/or inductive component 10. FIGS. 5 to 9 show different possible configurations of the damping circuit 1, in which said principles are met.

In some embodiments, as the ones shown in FIGS. 6 to 9, the switching actuator 13 includes a switching element configured to adopt a first state to cause the current i to flow through the first path of the damping circuit 1, and a second state to cause the current i to flow through the second path of the damping circuit 1. The switching actuator 13 can be, for example, a switching element, the first state being an open position of said switching element and the second state being a closed position of said switching element (or vice versa).

In other embodiments, as the ones shown in FIG. 5, the switching actuator 13 includes a plurality of switching elements, and it is configured to adopt two different states (one for each different operating conditions of the power conversion system 100). Each one of said switching elements can adopt two different states (opened or closed), and the controller 5 is configured to control the state of said switching elements according to the determined operating conditions for the power conversion system 100, the switching actuator 13 being thus caused to adopt one state or the other according to said control. The switching actuator 13 can include an active power converter including the plurality of switching elements.

The damping circuit 1 can further include a resonance damping component 11 with a certain impedance value, configured in such a manner that the current i flowing through the damping circuit 1 flows also through said resonance damping component 11 independently of the operating conditions of the power conversion system 100 (steady state conditions and transient state conditions). Thus, the current i flows through said resonance damping component 11 when the first path is selected and when the second path is selected. The resonance damping component 11 can thus be arranged in parallel to both paths, or in series before or after both paths. Thus, besides the active damping capacity given by the second impedance value during transient state conditions, a minimum damping ability is ensured also during steady state conditions, while the efficiency is improved compared with a damping system connected at the alternating current side 100a of the power conversion system 100 all the time.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

The invention claimed is:

1. A filtering method for an alternating current side of a power conversion system comprising a filter circuit arranged at said alternating current side, the filter circuit comprising a filter capacitor circuit and a damping circuit connected in series or in parallel to said filter capacitor circuit, the damping circuit comprising a switching actuator and providing two alternative paths with different impedance values to a current flowing through it, the filtering method comprising:
    determining if the power conversion system is operating under a steady state condition or under a transient state condition;
    controlling the damping circuit of the filter circuit to provide a first impedance value for the current that flows through said damping circuit based on determining that the power conversion system is operating under the steady state condition;
    controlling the damping circuit to provide a second impedance value for said current based on determining that the power conversion system is operating under the transient state condition; and
    controlling the switching actuator of the damping circuit to select a path to be followed by the current when the current flows through the damping circuit,
    wherein an electrical property to be measured is one of a module of a voltage signal and a module of a current signal of the alternating current side of the power conversion system, the power conversion system being determined to be operating under the steady state condition if a value of said electrical property is greater than a minimum predetermined value of a corresponding module and said electrical property is less than a maximum predetermined value of said corresponding module, and the power conversion system being determined to be operating under the transient state condition if the value of said electrical property is less than or equal to said minimum predetermined value of the corresponding module or said electrical property is greater than or equal to said maximum predetermined value of said corresponding module.

2. The filtering method according to claim 1, wherein said determining if the power conversion system is operating under the steady state condition or under the transient state condition comprises measuring the electrical property of at least one electrical signal associated with the alternating current side of the power conversion system and determining if the power conversion system is operating under the steady state condition or under the transient state condition according to said electrical property.

3. The filtering method according to claim 2, wherein the electrical property to be measured is one of a frequency of a voltage signal and a frequency of a current signal of the alternating current side of the power conversion system, the power conversion system being determined to be operating under the steady state condition if the value of said electrical property is greater than a minimum predetermined value of a corresponding frequency and said electrical property is less than a maximum predetermined value of said corresponding frequency, and the power conversion system being determined to be operating under the transient state condition if the value of said electrical property is less than or equal to said minimum predetermined value of the corresponding frequency or said electrical property is greater than or equal to said maximum predetermined value of said corresponding frequency.

4. The filtering method according to claim 1, wherein the switching actuator comprises a switching element that has two different states, each one of said states being associated with a path to be followed by the current when the current flows through the damping circuit, the method further comprising controlling the state of the switching element according to the measured electrical property at the alternating current side of the power conversion system, the path to be followed by said current when the current flows through the damping circuit between the two alternative paths being selected by said control.

5. The filtering method according to claim 1, wherein the switching actuator comprises a plurality of switching elements and is configured to adopt two different states, each one of said states being associated with a path to be followed by the current when the current flows through the damping circuit, the method further comprising controlling the state of the switching elements according to the measured electrical property at the alternating current side of the power conversion system in order to control the state of the switching actuator, the path to be followed by said current when the current flows through the damping circuit between the two alternative paths being selected by said control.

6. The filtering method according to claim 1, wherein the damping circuit further comprises a resonance damping impedance component connected in parallel to the two alternative paths for the current or in series to both of the two alternative paths, said resonance damping impedance component providing a fixed impedance, and said resonance damping impedance component being arranged in such a manner so the current that flows through the damping circuit also flows through said resonance damping impedance component in both the steady state condition and the transient state condition of the power conversion system.

7. The filtering method according to claim 1, wherein the damping circuit further comprises a resonance damping impedance component connected in series with the two alternative paths for the current or in series to both of the two alternative paths, said resonance damping impedance component providing a fixed impedance, and said resonance damping impedance component being arranged in such a manner so the current that flows through the damping circuit also flows through said resonance damping impedance component in both the steady state condition and the transient state condition of the power conversion system.

8. The filtering method according to claim 1, wherein the second impedance value is greater than the first impedance value.

9. A power conversion system for converting energy from an alternating current power source or a direct current power source, the power conversion system having an alternating current side and the power conversion system comprising:
a power converter connected to an electrical grid;
a filter circuit arranged at the alternating current side of the power conversion system, the filter circuit comprising a filter capacitor circuit;
a damping circuit connected in series or in parallel to the filter capacitor circuit and configured to provide a first impedance value for a current that flows through said damping circuit when the power conversion system operates under a steady state condition, and to provide a second impedance value for said current when the power conversion system operates under a transient state condition, the damping circuit comprising two alternative paths with different impedance values for the current that flows through said damping circuit, said current following a first path with the first impedance value or a second path with the second impedance value when the current flows through said damping circuit; and
a selector configured to select one of the two alternative paths to cause said damping circuit to provide the first impedance value or the second impedance value for said current that flows through said damping circuit according to whether the power conversion system is operating under the steady state condition or under the transient state condition,
wherein an electrical property to be measured is selected between a module of a voltage signal and a module of a current signal of the alternating current side of the power conversion system, and a controller being configured to determine that the power conversion system is operating under the steady state condition if a value of said electrical property is greater than a minimum predetermined value of a corresponding module and said electrical property is less than a maximum predetermined value of said module, and to determine that the power conversion system is operating under the transient state condition if the value of said electrical property is less than or equal to said minimum predetermined value of the corresponding module or said electrical property is greater than or equal to said maximum predetermined value of said corresponding module.

10. The power conversion system according to claim 9, wherein the selector comprises a measuring device for measuring the electrical property of at least one electrical signal associated with the alternating current side of the power conversion system, a switching actuator arranged in the damping circuit, and said controller being configured to determine, according to said measured electrical property, whether the power conversion system is operating under the steady state condition or under the transient state condition, and to control a state of the switching actuator to cause the damping circuit to provide the first impedance value or the second impedance value for the current that flows through said damping circuit according to said determination.

11. A power conversion system according to claim 10, wherein the electrical property to be measured is selected between a frequency of a voltage signal and a frequency of a current signal of the alternating current side of the power conversion system, the controller being configured to determine that the power conversion system is operating under the steady state condition if a value of said electrical property is greater than a minimum predetermined value of a corresponding frequency and said electrical property is less than a maximum predetermined value of said frequency, and to determine that the power conversion system is operating under the transient state condition if the value of said electrical property is less than or equal to said minimum predetermined value of the corresponding frequency or said electrical property is greater than or equal to said maximum predetermined value of said corresponding frequency.

12. A power conversion system according to claim 10, further comprising a controller configured to control the switching actuator to cause said current to flow through the first path or through the second path when flowing through said damping circuit, the damping circuit comprising at least one of a resistive and an inductive component through which said current flows when flowing through the second path.

13. The power conversion system according to claim 12, wherein the switching actuator is configured to adopt two different states according to whether the power conversion system is operating under the steady state condition or under the transient state condition, each one of said states being associated with a path followed by the current when the current flows through the damping circuit, and the controller being configured to determine whether the power conversion system is operating under the steady state condition or under the transient state condition and to control the state of said switching actuator according to said determination.

14. The power conversion system according to claim 13, wherein the switching actuator comprises a switching element which has an open state and a closed state.

15. The power conversion system according to claim 13, wherein the switching actuator comprises a plurality of switching elements, the controller being configured to control said switching elements according to the measured electrical property to control the state of the switching actuator.

16. The power conversion system according to claim 12, wherein the damping circuit further comprises a resonance damping impedance component connected in parallel to the two alternative paths for the current or in series to both of the two alternative paths, said resonance damping impedance component providing a fixed impedance, and said resonance damping impedance component being arranged so the current that flows through the damping circuit also flows through said resonance damping impedance component in both the steady state condition and the transient state condition of the power conversion system.

17. The power conversion system according to claim 12, wherein the damping circuit further comprises a resonance damping impedance component connected in series with the two alternative paths for the current, said resonance damping impedance component providing a fixed impedance, and said resonance damping impedance component being arranged so the current that flows through the damping circuit also flows through said resonance damping impedance component in both the steady state condition and the transient state condition of the power conversion system.

18. The power conversion system according to claim 9, wherein the second impedance value is greater than the first impedance value.

* * * * *